United States Patent [19]

Yanagiuchi et al.

[11] 4,438,505
[45] Mar. 20, 1984

[54] ELECTRONIC DICTIONARY AND LANGUAGE INTERPRETER WITH AUTO-SEARCH KEY FOR DERIVING A FULL-LENGTH WORD AND ITS ASSOCIATED TRANSLATION WORD BASED ON A PARTIAL WORD ENTERED

[75] Inventors: Shigenobu Yanagiuchi, Tenri; Mituhiro Saizi, Kyoto, both of Japan

[73] Assignee: Sharp Kabushiki Kaisha, Osaka, Japan

[21] Appl. No.: 119,662

[22] Filed: Feb. 8, 1980

[30] Foreign Application Priority Data

Feb. 9, 1979 [JP] Japan .................................. 54-14813

[51] Int. Cl.³ ............................................ G06F 15/38
[52] U.S. Cl. .................................... 364/900; 364/419; 434/157
[58] Field of Search ... 364/200 MS File, 900 MS File, 364/419, 705, 706, 709; 434/157; 340/152 R, 152 T; 179/1 SM; 400/109, 484

[56] References Cited

U.S. PATENT DOCUMENTS

| | | | |
|---|---|---|---|
| 4,007,443 | 2/1977 | Broomberg et al. | 364/900 |
| 4,117,542 | 9/1978 | Klausner et al. | 364/900 |
| 4,130,882 | 12/1978 | Swanstrom et al. | 364/900 |
| 4,158,236 | 6/1979 | Levy | 364/900 |
| 4,159,536 | 6/1979 | Kehoe et al. | 364/900 |
| 4,164,025 | 8/1979 | Dubnowski et al. | 364/900 |
| 4,218,760 | 8/1980 | Levy | 364/900 |
| 4,279,022 | 7/1981 | Abe | 364/900 |
| 4,328,562 | 5/1982 | Hashimoto et al. | 364/900 |
| 4,339,806 | 7/1982 | Yoshida | 364/900 |
| 4,355,370 | 10/1982 | Yanagiuchi | 364/900 |

FOREIGN PATENT DOCUMENTS

| | | | |
|---|---|---|---|
| 2951191 | 6/1980 | Fed. Rep. of Germany | 364/900 |
| 1448211 | 9/1976 | United Kingdom | 364/900 |
| 2014765 | 8/1979 | United Kingdom | 364/900 |

OTHER PUBLICATIONS

New Yorker, Apr. 1979, p. 136, "Travel with Your Own Interpreter", Advertisement by Craig Corp.
Scientific American, Feb. 1979, pp. 4–5, "Language Translator", Advertisement by JS&A Products.
Popular Science, Apr. 1979, p. 81, "Hand-Held Language Translators", L. Wessner.
Popular Science, Feb. 80, pp. 78–79, "Language Translators–More Models and New Tricks", B. Hawkins.

Primary Examiner—James D. Thomas
Assistant Examiner—Archie E. Williams, Jr.
Attorney, Agent, or Firm—Birch, Stewart, Kolasch & Birch

[57] ABSTRACT

A portable electronic dictionary and language interpreter includes a control circuit for conducting retrieval of one or more full-length words on the basis of a non full-length form entered by an input device. The one or more complete words are preliminarily stored in a memory such as a read-only memory (ROM). The control circuit is activated by a search key provided on the main frame of the portable device. According to the repetition of the actuation of the search key, a plurality of full-length words are successively developed from the memory and then indicated in a display. In another form of the present invention, another type of search key may be provided so that the plurality of full-length words can be successively developed and then indicated.

11 Claims, 10 Drawing Figures

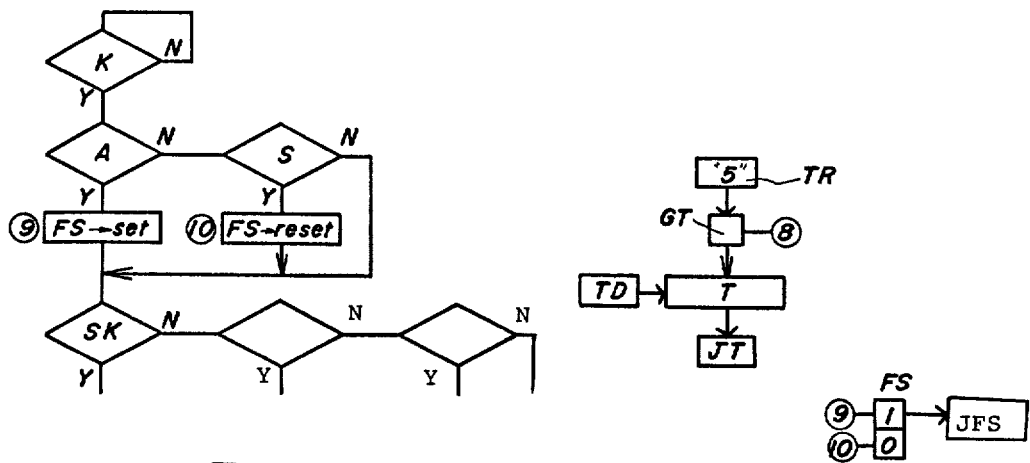
FIG. 6
FIG. 8
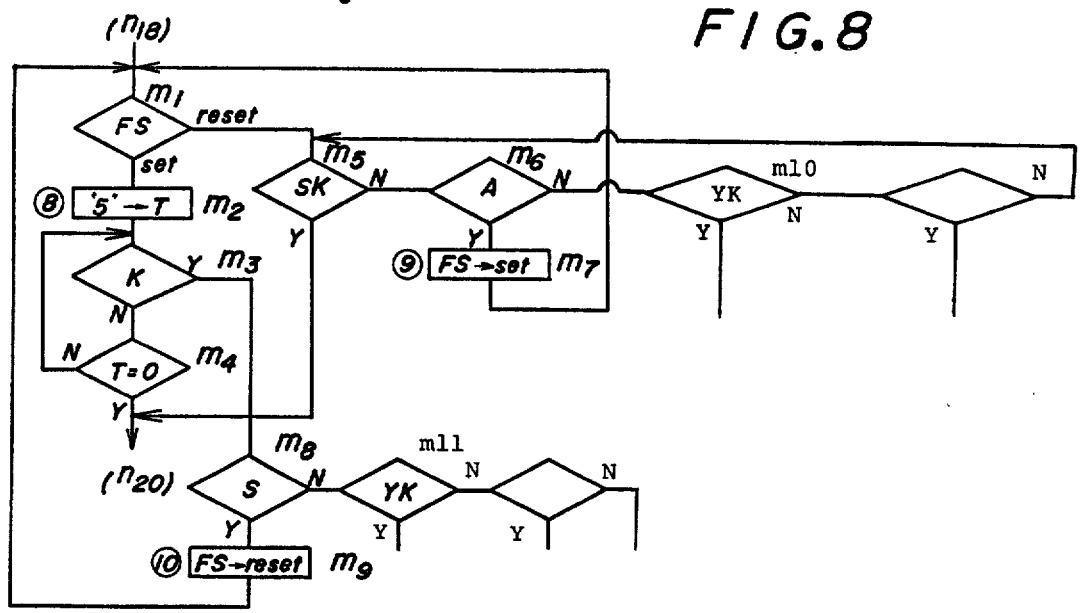
FIG. 7

| | (A) | (B) |
|---|---|---|
| $m_1$ | FUJINAMI | 03-123-4567 |
| $m_2$ | TAKAGI | 052-345-6789 |
| $m_3$ | TAO | 06-567-8901 |
| | INOUE | 0744-22-3344 |
| | KANTOH | 07435-3-5521 |
| | UMEDA | 06-621-1221 |
| | KANAYAMA | 03-260-1161 |
| | KIMATA | 07436-5-1321 |
| | MASAOKA | 02874-3-1131 |
| | MORIMOTO | 08242-8-2401 |
| | MISAWA | 06-791-7301 |
| $m_{12}$ | TANIKI | 06-791-7221 |
| | SATOH | 0729-54-1121 |
| | ITOH | 011-562-1256 |
| | TODA | 0222-94-3247 |
| | SHINTAKU | 0272-24-3559 |
| | SUMI | 03-625-5111 |
| | WAKAMATSU | 052-733-0911 |
| $m_{19}$ | AOKI | 06-643-3021 |
| $m_{20}$ | OHSUGI | 08287-4-4925 |

FIG. 9

FIG. 10 sacrifice
$2
sad
$2
sadly
$3
sadness
$3
safe
$2
safely
$4
safety
$4
said
$2
sail
$3
sailor
$4
sake
$2
sale
$2
salesman
$4
sally
$3
salt
$3
same
$2
sapd
$2
sandwich
$4
santaclaus
$3
satisfaction
$2
satisfactory
$9
satisfy
$6

ELECTRONIC DICTIONARY AND LANGUAGE INTERPRETER WITH AUTO-SEARCH KEY FOR DERIVING A FULL-LENGTH WORD AND ITS ASSOCIATED TRANSLATION WORD BASED ON A PARTIAL WORD ENTERED

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from conventional types of electronic devices in that the former is of a unique structure which provides for efficient and rapid retrieval of word information stored in a memory. An example of such electronic dictionaries and language interpreter was disclosed in U.S. Pat. No. 4,158,236, June 12, 1979, to Levy entitled "ELECTRONIC DICTIONARY AND LANGUAGE INTERPRETER". In this patent, a means was disclosed which displayed all the words which were stored in a ROM having letters which matched letters entered by the user.

The letters entered were related to a complete word designated by all its letters the user has entered and is sure of or, in addition, a partial word represented by letters he has entered and is sure of and a blank character he entered and is not sure of.

The complete word and the partial word will be displayed and all other words which match the entered letters will then be examined. In connection with the entry of the partial word, however, it will be further desirous that the translation corresponding to a complete specific word relevant to the partial word entered be searched for or examined and then displayed together with the complete specific word.

SUMMARY OF THE INVENTION

Accordingly, it is an object of the present invention to provide an improved portable word information device with faculties for examining and simultaneously displaying a full-length or complete word and a translated word corresponding thereto, the complete word being selected from a partial word entered with an input keyboard.

It is another object of the present invention to provide an improved electronic dictionary and language interpreter comprising means for determining and simultaneously displaying a full-length or complete word and a translated word corresponding thereto on the basis of a partial word entered with an input keyboard.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic dictionary and language interpreter comprises a control circuit for retrieving one or more full-length words in response to entry of a non full-length form. The one or more full-length words are preliminarily stored in a memory such as a read-only memory (ROM). The control circuit is activated by a search key provided on the main frame of the portable device.

According to the repetition of the actuation of the search key, a plurality of full-length words are successively developed from the memory and then indicated in a display. In another form of the present invention, another type of search key may be provided so that the plurality of full-length words can be successively developed and then indicated.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 5 through 7 show flow charts;

FIG. 8 shows a block diagram of an additional circuit applied to the control circuit indicated in FIG. 2; and FIGS. 9 and 10 are schematic representations of storage conditions within a memory unit contained within the control circuit represented in FIG. 2.

DESCRIPTION OF THE INVENTION

First of all, any kind of language may be applied to the portable electronic dictionary and language interpreter of the present invention. An input "source" word or words is spelled in a specific language to obtain an equivalent word or words, or a translated word spelled in a different language corresponding thereto. The kind of the language may be freely selected. According to an example of the present invention, it is assumed that the specific language is English and the different language is Japanese.

Figure 1:
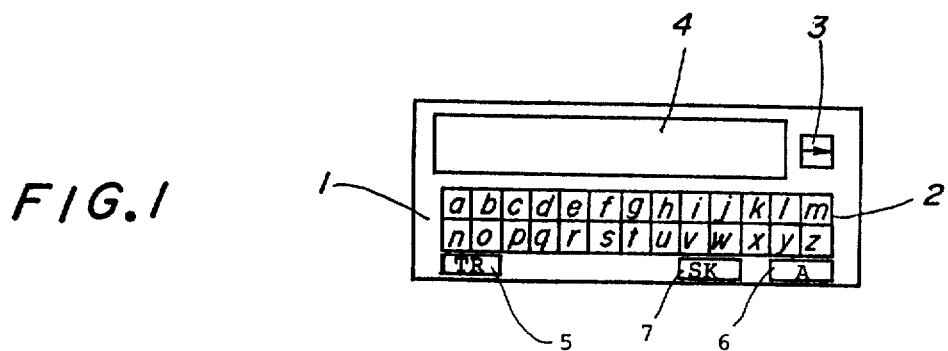
FIG. 1 is a plan view of a portable electronic dictionary and language interpreter according to the present invention.

Referring to FIG. 1, a portable electronic dictionary and language interpreter of the present invention comprises a body 1, a keyboard unit 2 containing a plurality of alphabetical character keys, a search key 3, a display 4, a translation key 5, an auto-search key 6 and a single search key 7.

The keyboard unit 2 is activated to provide any desired partial English "source" word. The term partial English "source word" as used herein means an English word representing letters the user enters and is sure of and one or more blank letters he enters but is not sure of. The search key 3 is employed to initiate the retrieval for one or more full-length English words.

The term "full-length English word" as used herein means an English word containing all the alphabetical letters partially matching the letters entered by the use. According to a preferred embodiment of the present invention, a key is not provided for entering the one or more blank letters. The auto-search key 6 and the single search key 7 are described below.

In another preferred embodiment of the present invention, a key may be provided to enter the one or more blank letters.

The retrieval for one full-length English word is carried out as follows:

(1) One or more alphabetical letter keys within the keyboard unit 2 are actuated to enter a partial English "source" word.

(2) The search key 3 is actuated to initiate the retrieval for one full-length English word. The full-length English word is indicated in the display 4. One or more leading letters within the full-length English word are exactly the letters entered by the alphabetical letter key.

When there are two or more full-length English words stored in a memory within the electronic dictionary and language interpreter which have one or more leading letters matching exactly the letters entered by the one or more alphabetical letter keys, the first full-length English word indicated in the display 4 is stored in the leading address of the memory. In accordance with further actuation of the search key 3, the second complete English word is taken out of the memory and then indicated in the display 4.

The remaining full-length English words can be taken out of the memory and then indicated in the display 4 according to the required repetition of the actuation of the search key 3.

After the actuations of the search key 3, the translation key 5 is activated to cause the retrieval of Japanese translated word equivalent to the full-length English word presently indicated in the display 4.

Figure 2:
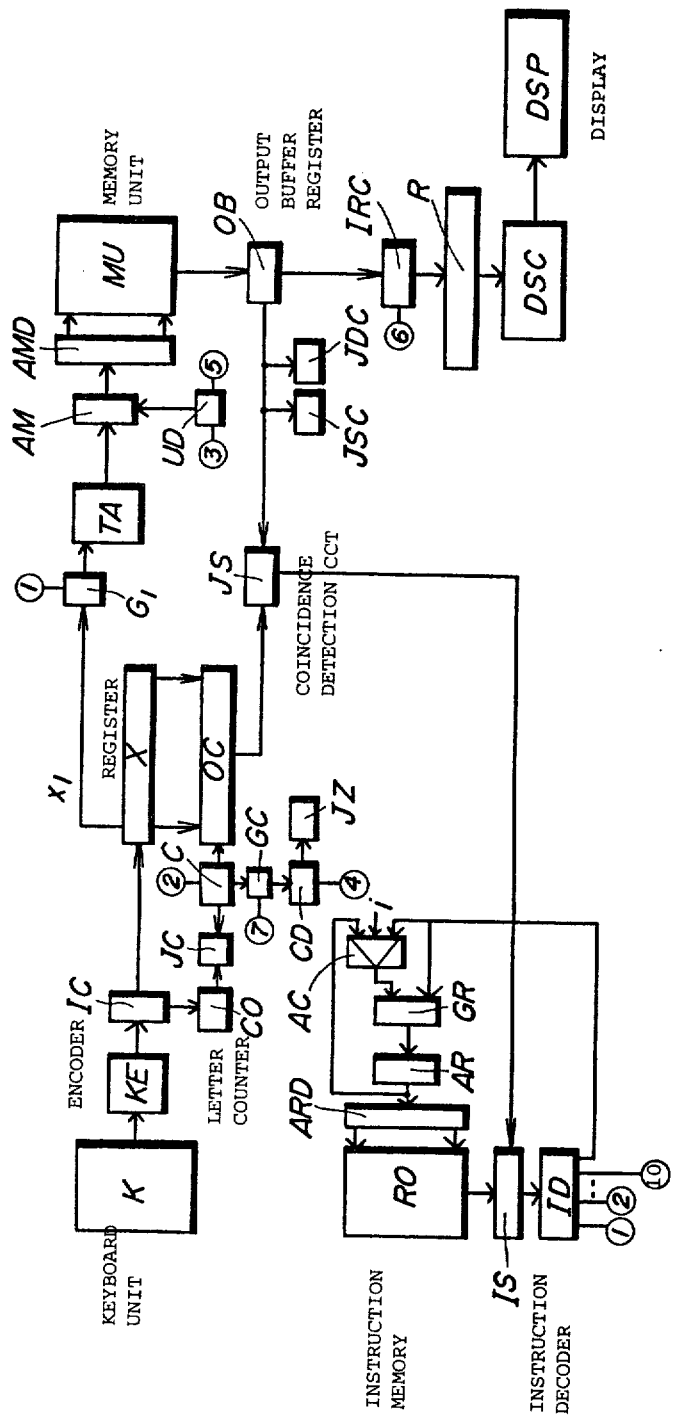
FIG. 2 is a block diagram of a control circuit incorporated within the electronic dictionary and language interpreter shown in FIG. 1.

FIG. 2 shows a block diagram of a control circuit incorporated within the portable electronic dictionary and language interpreter represented in FIG. 1. The control circuit comprises a keyboard unit K, an encoder KE, a register X, an input control circuit IC, a letter counter CO, an output control circuit OC, a counter C, a subtraction counter CD, a gate circuit GC, a zero-detection circuit JZ, and a coincidence detection circuit JC.

The keyboard unit K associated with the keyboard unit 2, the search key 3, and the translation key are all indicated in FIG. 1. The encoder KE is connected to the keyboard unit K to encode key input signals. The register X is provided for storing code signals entered by the keyboard unit K. The input control circuit IC is interposed between the encoder KE and the register X to control the introduction of the code signals into the register X. The letter counter CO is coupled to the input control circuit IC for counting the number of letters entered by the keyboard unit KE in the form of the code signals.

The output control circuit OC is connected to the register X for controlling the transference of the code signals from the register X. The counter C is coupled to the output control circuit OC for directing the number of letters developed from the register X to the output control circuit OC. The subtraction counter CD is provided for memorizing the contents of the counter C and for causing the subtraction. The gate circuit G is interposed between the counter C and the subtraction counter CD.

The zero-detection circuit JZ is connected to detect the zero-condition of the contents of the subtraction counter CD. The coincidence detection circuit JC functions to determine the equivalency between the contents within the letter counter CO and that of the counter C. The coincidence detection circuit JC determines the number of letters contained within the full-length word developed from the memory unit MU for examining purposes.

The letters of the number determined by the coincidence detection circuit JC are examined with the letters contained within the word entered by the keyboard unit K.

The control circuit further comprises a memory unit MU, an address selection circuit TA, an input gate G1, an address register AM, an address decoder AMD, an up-down counter UD, an output buffer register OB, a coincidence detection circuit JS, an SC code detection JSC, a DC code detector JDC, a display register R, a display input circuit IRC, a display control circuit DSC, and a display DSP.

The memory unit MU is composed of read ony memory (ROM). The memory unit MU stores a plurality of pairs of full-length English words and their translated Japanese words, preliminarily. The address selection circuit TA acts to define the address to be selected in the memory unit MU.

The input gate G1 is interposed between the register X and the address selection circuit TA. The up-down counter UD allows the address stored in the address register AM to be counted up or down. The output buffer register OB is provided for controlling output signals from the memory unit MU to the following circuit elements. The coincidence detection circuit JS is placed between the output control circuit OC and the output buffer register OB for determining the equivalency between the contents of them.

Figure 4:
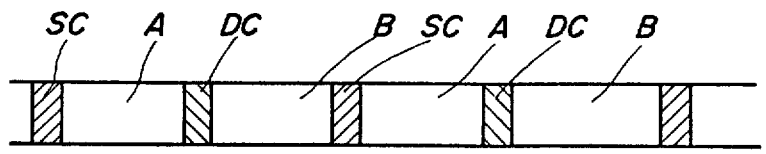
FIG. 4 is a schematic representation of storage conditions of English word information and Japanese word information and the like stored in a memory.

The SC code detector JSC detects SC code stored just before the respective words which are contained within the memory unit MU. The DC code detector JDC senses DC code stored for separation between a particular English word and its equivalent Japanese word, each of which is stored in the memory unit MU. In FIG. 4, a schematic representation of the storage format for a plurality of pairs of an English word and its equivalent Japanese word is depicted.

Information area specified as A in FIG. 4 is related to English word information and information area denoted as B is related to Japanese word information. The information area B may contain other information such as a part of speech in connection with the English word stored in the preceding information area A.

The display input circuit IRC is connected to the output buffer register OB to transfer the word data into the display register R. The display control circuit DSC is coupled to the display DSP for controlling the indication of the word data and other data in the display DSP.

The control circuit still further comprises an instruction memory RO, an address register AR, an address decoder ARD, an input gate GR, a count-up circuit AC, an instruction selection circuit IS, and an instruction decoder ID. The instruction memory RO stores a plurality of instruction data in the form of code information to form the program for the present invention.

The instruction decoder ID develops instruction signals ① through ⑩ under the control by the instruction selection circuit IS. The count-up circuit AC is controlled by output signals from the instruction decoder ID. The count of the count-up circuit AC is applied to the address register AR through the input gate GR. The instruction memory RO is addressed by the address decoder ARD. The instruction selection circuit IS receives comparison-results output signals from the coincidence detection circuit JS. Although not shown, the instruction decoder ID delivers output signals entered to all the determination circuits JS, JSC, JDC, JC, JZ, JT and JFS. All the determination circuits develop output signals entered to the instruction selection circuit IS.

Figure 3:
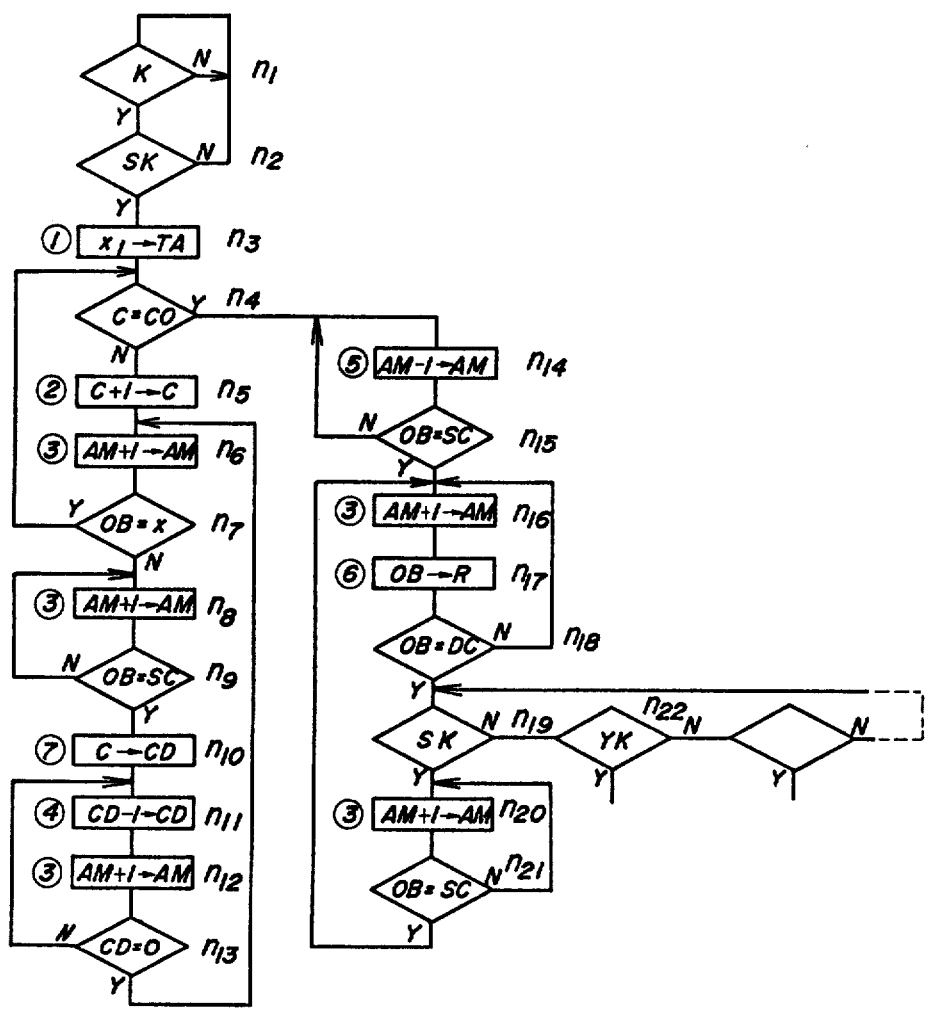
FIG. 3 is a flow chart explaining operations of the control circuit shown in FIG. 2.

FIG. 3 shows a flow chart explaining retrieval operations performed by the control circuit represented in FIG. 2. With reference to the flow chart shown in FIG. 3, a program step n1 is processed to determine the entry of word data by the keyboard unit 2. The following program step n2 is executed to determine the actuation of the search key 3 as labeled by the right-directed arrow. When the keyboard unit 2 and the search key 3 are both energized, the following program step n3 is carried out where the address selection circuit TA receives the code signals stored in the register X which represent the first-digit alphabetical letter within an English word containing one or more letters, the English word being stored in the register X. Instruction signals ① labeled adjacent to the program step n3 are applied to the input gate G1.

A program step n4 is executed so that the coincidence detection circuit JC determines the equivalency between the contents of the counter C and that of the letter counter CO. The letter counter CO counts the number of letters entered into the register X.

The counter C selects the number of output letters to be applied to the output control circuit OC. The output control circuit OC receives output signals from the register X. When the coincidence detection circuit JC detects the equivalency between the counter C and the letter counter CO, namely, "YES" is determined in the program step n4, the following program step n14 is selected. If "NO" is detected, a program step n5 is selected.

The program step n5 is executed to allow the counter C to add by one by the introduction of instruction signals ② thereto. The following program step n6 is processed to allow one to be added to the contents of the address register AM by application of instruction signals ③ to the up-down counter UD. The object of program step n6 is to advance the address of the memory unit MU by one. The memory unit MU stores a plurality of words in such a manner that each address of the memory unit MU stores only one letter. When the count in the counter C is increased by one by increase of the digit of the output signals from the register X, the address to be set for the memory unit MU is also increased by one with the object that the comparison between the digit of the output signals from the register X and the same of the memory unit MU becomes possible.

The following program step n7 is executed so that the coincidence detection circuit JS determines the equivalency between one-digit representation signals from the output control circuit OC coupled to the register X and the same of the output buffer register OB. If equivalency therebetween is present, the program returns to the program step n4.

As long as the contents of the counter C are not equal to that of the letter counter CO, the program steps n5 through n7 are repeated. When "NO" is detected in the program step n7, the following program step n8 is executed. In the program step n8, the address to be specified in the memory unit MU is increased by one according to "AM+1→AM". As shown in FIG. 10, the memory unit MU contains a plurality of words in the alphabetical order.

The smaller the number of letters contained within an English word, the earlier the English word is stored in the memory unit MU in the alphabetical order convention. Under the condition that the input English word has two or more alphabetical letters, the number of the address to be set in the memory unit MU arise. Instruction signals ③ are entered to the up-down counter UD.

A further program step n9 is executed so that the SC code detector JSC senses the SC code stored for the separation between pairs of a full-length English word and a translated Japanese word. Before the SC code is detected, the program step n8 is executed so that the address set in the address register AM is advanced by one. When "YES" is sensed in the program step n9, the following program step n10 is selected. A sequence of program steps n10 through n13 is executed so that the address set in the address register AM is increased by the number of upper digits that are determined to exist in the preceding program steps n5 through n7.

In the program step n10, the contents of the counter C are transferred to the subtraction counter CD by the application of instruction signals ⑦ into the gate circuit GC. In the program step n11, the contents of the subtraction counter CD are subtracted by one by the introduction of instruction signals ④ into the subtraction counter CD. In the program step n12, the address set in the address register AM is increased by one through the entry of the instruction signals ③ into the up-down counter UD.

The program step n13 is conducted for the zero-detection circuit JZ to detect whether the subtraction counter CD contains only zero information. The program returns to the program step n6 after the program step n13.

The above-described operations are effected so that one English word, having the same leading letter as the leading letter contained within the partial English word entered, is output by the retrieval. The developed English word is displayed in the display 4 in the manner described below.

In the program step n4, the contents of the counter C are equivalent to that of the letter counter CO. In such a case, the address register AM sets the address that is obtained by the addition of the number of letters, contained in the input partial English word, to the number of the address representing the SC code preceding the information area A storing the developed full-length English word.

In the program steps n14 and n15, the address set in the address register AM returns to the address in connection with the SC code preceding the information area A storing the developed English word. The program step n14 is conducted so that the contents of the address register AM are reduced by one through the application of instruction signals ⑤ to the up-down counter UD. The program n15 is effected for the SC code detector JSC to determine whether the output buffer register OB connected to the memory unit MU contains the SC code. When the SC code detector JSC detects the SC code in the output buffer register OB, the following program step n16 is selected so that the address in the address register AM increases by one by means of the introduction of the instruction signals ③ into the up-down counter UD. The output buffer register OB receives the first letter information from the memory unit MU.

The following program step n17 is conducted to allow the contents of the output buffer register OB to be transferred into the display register R under the control of the instruction signals ⑥ applied to the display input circuit IRC coupled to the display register R. A further program step n18 is effected for the DC code detector JDC to detect the development of the DC code from the memory unit MU to the output buffer register OB. If the D.C. code is not detected, the program step n16 is selected. The letters of the full-length English word developed from the memory unit MU are then stored in the display register R.

The word data presently stored in the display register R is indicated in the display DSP through the control of the display control circuit DSC. The following program step n19 is executed to determine the actuation of the search key 3 denoted as "SK". When the search key 3 is actuated, program step n20 is selected wherein one is added to the address of the address register AM through the introduction of the instruction signals ③ into the up-down counter UD. A further program step n21 is executed for the SC code detector JSC to detect next SC code in the contents of the output buffer register OB, the SC code being associated to next English word. When the next SC code is present in the output buffer register OB and the address register AM sets the address in connection with next SC code, the program returns to the program step n16. In this way, each time the search key 3 is actuated, the following English words are successively developed and indicated in the display 4.

A further program step n22 is executed to determine whether the translation key 5 is actuated as denoted as "YK" after the search key 3. When the translation key 5 is actuated, the contents of the address register AM should be changed from the address obtained by the addition of one to the address of the DC code, to the address of next SC code. In such a case, the display register R receives the output signals from the output buffer register OB, subsequently. In this way, the translated Japanese word in connection with the developed full-length English word is generated from the memory unit MU and indicated in the display 4.

When "NO" is detected in the program step n22, the following operations may be carried out which contain a further program step wherein the actuation of a variant key operable for examining conjugation is present, a still further program step wherein the actuation of an idiom key operable for examining idioms using the developed full-length word is detected and, the like. When "YES" is detected in the program step n22 and other program steps, predetermined operations are to be carried out.

In the above mentioned preferred embodiment of the present invention, the memory unit MU stores a plurality of English words in the alphabetical order as shown in FIG. 10. According to another form of the present invention, the memory unit MU contains a plurality of full-length English words at random as described below. In FIG. 10, non-alphabetical symbols such as "$" may be used for indicating two or more alphabetical letters to permit the capacity of the memory unit MU to be minimized.

Figure 5:
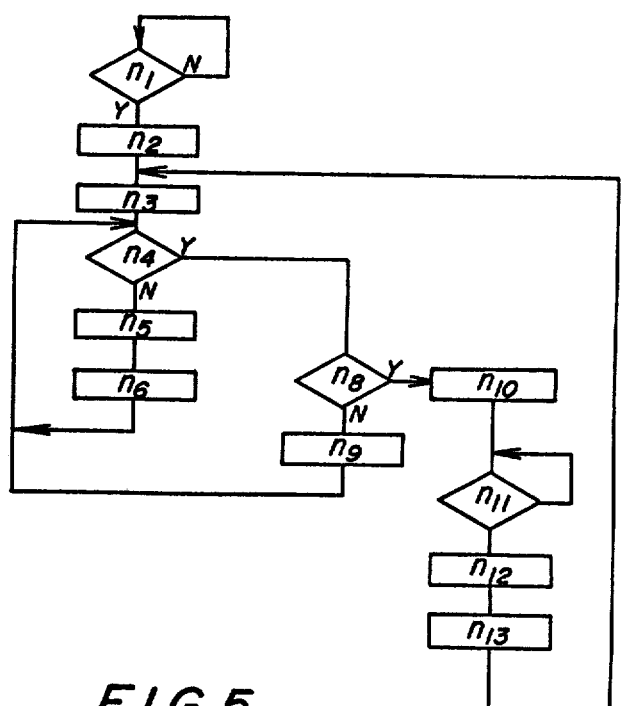

FIG. 5 shows a flow chart representing retrieval operations of the control circuit wherein the memory unit MU stores a plurality of English words at random. Some operations of the flow chart in FIG. 5 are common to that of FIG. 3.

The first program step n1 is executed to detect the actuation of the keyboard unit 2 and the search key 3. The following program step n2 is conducted so that the address register AM sets the leading address for all the full-length English words. With reference to FIG. 9(A), "F" of "FUJINAMI" stored in the address m1 is to be developed.

A program step n3 is effected such that the register X develops first letter information to the address selection circuit TA. When "TA" is actuated in the keyboard unit 2 for examining a plurality of family names starting at "TA", "T" is developed from the register X. The following program step n4 is executed so that the coincidence detection circuit JS determines the correspondence between the contents of the output buffer register OB and that of the register X. If "NO" in present in the program step n4, a further program step n5 is effected to increment the address register AM to increase the address to next information area A which contains the next English word.

A further program step n6 is executed to allow the counter C to be canceled, and the program returns to the program step n4. In the program step n4, the contents of the output buffer register OB are determined to be equivalent to the contents of the output control circuit OC from the register X.

When "YES" is detected in the program step n4, the following program step n8 is selected. In the program step n8, the coincidence detection circuit JC detects the equivalency between the contents of the counter C and that of the letter counter CO. If "YES" is not obtained in the program step n8, the following program step n9 is selected so that the address of the address register AM is advanced by one. The program returns to the program step n4.

If "YES" is obtained in the program step n8, one of the full-length English words is developed in the following program step n10. A further program step n11 is executed to detect the actuation of the search key 3. When it is detected, the program proceeds to the further program step n12 wherein the address stored in the address register AM is increased to further increase the information area. In the following program step n13, the counter C is canceled so that the program returns to the program step n3.

FIG. 9 shows a schematic representation of an exemplary storage format for the memory unit MU wherein a plurality of full-length English words are stored at random. In FIG. 9 the memory unit MU stores a plurality of pairs of family names of the persons as shown in (A) and telephone numbers for the persons as shown in (B). A plurality of numerals m1 through m20 are labeled to indicate the respective addresses.

The telephone numbers shown in (B) are developed together with the family names of the persons shown in (A).

For the purpose of the retrieval to the memory unit MU containing the storage format depicted in FIG. 9, a single scanning operation and an auto-scanning operation are utilized as follows. The single scanning operation as used herein means that a plurality of full-length words are successively developed and indicated in the display 4 according to one actuation of the single search key 7, in the storage order in the memory unit MU. The auto-scanning operation as used herein represents that the auto-search key 6 is actuated to permit a plurality of full-length English words to develop automatically and be indicated in the display 4 in turn. In both scanning operations, when the translation key 5 is actuated after the desired type of full-length English word is developed and indicated in the display 4, a translated Japanese word equivalent to the desired type of full-length English word is developed and indicated.

To conduct the single scanning operation and the auto-scanning operation, the following is required:

(1) The flow chart shown in FIG. 6 is conducted in place of the first and the second program steps n1 and n2 in the flow chart shown in FIG. 3. In FIG. 6, a numeral "A" represents the actuation of the auto-search key 5 and a numeral "S" designates the actuation of the single search key 7.

(2) The flow chart indicated in FIG. 7 is inserted in place of the program step n19 between the program steps n18 and n20 of the flow chart in FIG. 3. Two numerals "A" and "S" shown in FIG. 7 represent the same meanings as in FIG. 6.

(3) The block diagram shown in FIG. 8 is added to the block diagram shown in FIG. 2 wherein two detection circuits JT and JFS are coupled to the instruction decoder ID and the instruction selection circuit IS.

With reference to FIG. 8, there are provided a time-keeping register T, a count-down circuit TD, a register TR, a gate circuit GT, a zero-detection circuit JT, a flip flop FS, and a flip flop detection circuit JFS. The time-keeping register T functions to procedure time-keeping operations. The countdown circuit TD acts to count down time information stored in the time-keeping register T at a certain amount in a certain interval. The register TR is connected for providing the initial amount of the time-keeping register T. The zero-detection circuit JT is provided for detecting whether the time-keeping register T contains zero information only. As shown in the flow chart of FIG. 6, the flip flop FS is provided to determine the auto-scanning operation and the single scanning operation according to set and reset conditions thereof, respectively. The instruction signals ⑨ and ⑩ detection circuit JFS is connected to the flip flop FS for detecting set and reset conditions of the flip flop.

With reference to FIG. 7, following the program step n18 wherein English words are stored in the display register R for displaying purposes, a program step m1 is executed to determine whether the flip flop FS is set or reset.

When the flip flop FS is placed in the set conditions, a further program step m2 is conducted such that the register TR provides the initial value, say, "5", of the time information to the time-keeping register T by the introduction of the instruction signals ⑧ into the gate circuit GT. The time information contained within the time-keeping register T is counted down by the count-down circuit TD. The following program step m3 is executed to allow the actuation of alphabetical keyboard 2 to be detected. If the alphabetical keyboard 2 is not actuated, the following program step m4 is executed to allow the detection of whether the contents of the time-keeping register T are zero or not.

If the time-keeping register T does not contain zero information, the program returns to the program step m3, in which case the English word remains displayed in the display 4 until the contents of the time-keeping register T become all zero.

When it is detected in a further program step m1 that the flip-flop FS is placed in the reset condition, the following program step m5 is selected wherein the actuation of the search key 3 is detected.

When the search key 3 is actuated, the following program step n20 is selected. When it is not actuated, a further program step m6 is selected so that the actuation of the auto-search key 6 is detected. If the auto-search key 6 is actuated, the flip flop FS is reset and the program returns to the program step m1. If, under the condition that the auto-scanning operation has been conducted, the single-scanning operation is effected, program steps m8 and m9 are executed such that the flip flop FS is turned reset.

Further program steps m10 and m11 are conducted to determine the actuation of the translation key 5.

When "NO" is detected in the program steps m10 and m11, still further program steps should be conducted.

The invention being thus described, it will be obvious that the same may be varied in many ways. Such variations are not to be regarded as a departure from the spirit and scope of the invention, and all such modifications are intended to be included within the scope of the following claims.

We claim:

1. An electronic word conversion device wherein a first word or words represented in a first language are entered to obtain a second word or words represented in a second language equivalent to the first word or words, comprising:

input means operable for entering a partial word in said first language, said partial word containing at least one character;

means for storing a plurality of full-length words in said first language and their associated translated words in said second language;

means for addressing the storing means so as to search the plurality of full-length words and their associated translated words;

means for selecting at least one of said full-length words containing letters corresponding to the letters contained within said partial word;

auto-search means responsive to a single actuation of an auto-search key for selectively driving said means for selecting to repetitively enable said addressing means to select a plurality of full-length words having one or more characters common to the partial word and the translated words corresponding to said full-length word;

display means, responsive to said means for selecting, for indicating each full-length word and its associated translated word selected by said addressing means; said full-length words and their associated translation words being separated in said storing means from adjacent full length words and their associated translation words by first separation code information, said first separation code information being used by said addressing means to locate the beginning of each full-length word in said storing means; and auto-search enable flip-flop being set to selectively activate said auto-search means; said device, when said auto-search means is disabled by resetting said flip-flop to place said device in a single scanning mode, displaying only a single full-length word and its associated translation.

2. The device as set forth in claim 1, wherein the storing means comprises a read-only memory (ROM).

3. The device as set forth in claim 1, wherein said full-length words and their associated translated words are separated in said storing means by second separation code information interposed there between, said second separation code information being used by said addressing means to locate the beginning of each translated word in said storing means.

4. The device as set forth in claim 1, wherein said input means includes;
   alphabetical key switch means for entering said partial words;
   search key means for energizing said selecting means to thereby examine said full-length words; and
   translation key means for energizing said selecting means to allow said translated words to be examined.

5. The device as set forth in claim 1, wherein said addressing means includes means for detecting the first separation code information to control operations of the addressing means.

6. The device as set forth in claim 1, wherein the addressing means comprises:
   address register means coupled to said storing means for addressing said storing means according to the number of the address set therein;
   counter means coupled to said address register means for controlling for said address register means to change the number of the address in a sequential fashion;
   circuit means connected to said storing means for receiving output signals from said storing means;
   buffer means coupled to said input means for receiving the data entered by said input means; and
   comparison means connected to said circuit means and said buffer means for determining the equivalency between the contents of said circuit means and the data received by said buffer means.

7. An electronic word conversion device wherein a first word or words represented in a first language are entered to obtain a second word or words represented in a second language equivalent to the first word or words, comprising:
   input means operable for entering a partial word containing at least one character;
   memory means for storing a plurality of full-length words and their associated translated words;
   address means for accessing said memory means;
   activate means for enabling said address means;
   auto-search means selectively driving said activate means to repetitively drive said address means so that a plurality of full-length words having one or more characters common to the partial word, and their associated translated words corresponding to the full-length words may be selected, said continuous activation of said address means occurring in response to a single actuation of an auto-search key;
   auto-search enable flip-flop being set to selectively activate said auto-search means; said device, when said auto-search means is disabled by resetting said flip-flop to place said drive in a simple scanning mode, displaying only a single full-length word and its associated translation; and
   display means for displaying said full-length words and then associated translated words.

8. The device as set forth in claim 7, further comprising:
   means responsive to the input means for developing character information including at least one character; and
   means for controlling the number of characters developed by said means for developing;
   said controlling means controlling the address set in the address means so that the character information developed by said developing means is equivalent to the portion of said memory means associated with said address.

9. The device of claim 1 further comprising:
   input storage means for storing said partial word, said means for selecting comparing each character in said partial word stored in said input storage means with characters contained within said full-length words in said storing means;
   said display means indicating said full-length word and its associated translation corresponding to said partial word in response to a correspondence between each character of said partial word and a corresponding character of said full-length word determined by said means for selecting.

10. The device of claim 1 further comprising:
    translation enable means for selectively enabling the displaying of said associated translated words by said display means, the display of said associated translated words being enabled by actuation of a translation key.

11. The device of claim 7 further comprising:
    translation enable means for selectively enabling the displaying of said associated translated words by said display means, the display of said associated translated words being enabled by actuation of a translation key.

* * * * *